United States Patent
Snijkers-Hendrickx et al.

(10) Patent No.: US 6,583,551 B2
(45) Date of Patent: Jun. 24, 2003

(54) LOW-PRESSURE MERCURY VAPOR DISCHARGE LAMP AND COMPACT FLUORESCENT LAMP

(75) Inventors: Ingrid Josef Maria Snijkers-Hendrickx, Eindhoven (NL); Remy Cyrille Broersma, Eindhoven (NL); Rene Jan Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 139 days.

(21) Appl. No.: 09/771,874

(22) Filed: Jan. 29, 2001

(65) Prior Publication Data

US 2001/0026122 A1 Oct. 4, 2001

(30) Foreign Application Priority Data

Feb. 1, 2000 (EP) .............................................. 00200322

(51) Int. Cl.⁷ .............................. H01J 1/62; H01J 63/04; H01J 17/16
(52) U.S. Cl. ....................................... 313/493; 313/635
(58) Field of Search ................................ 313/489, 493, 313/634, 635

(56) References Cited

U.S. PATENT DOCUMENTS

| | | | |
|---|---|---|---|
| 4,544,997 A | 10/1985 | Seuter et al. ............... | 362/263 |
| 5,336,971 A * | 8/1994 | Vermeulen et al. ..... | 313/493 X |
| 5,665,660 A * | 9/1997 | Yamawaki et al. ..... | 313/493 X |
| 5,753,999 A * | 5/1998 | Roozekrans et al. ........ | 313/489 |
| 5,844,357 A * | 12/1998 | Iida et al. ................... | 313/493 |
| 6,281,625 B1 * | 8/2001 | Tachibana et al. .......... | 313/489 |

FOREIGN PATENT DOCUMENTS

EP          0034494 A1    2/1981    ............ H01J/61/35

* cited by examiner

Primary Examiner—Fred L Braun
(74) Attorney, Agent, or Firm—Frank Keegan

(57) ABSTRACT

The present invention relates to an improved maintenance, low-pressure mercury vapor discharge lamp having a discharge vessel enclosing a discharge space provided with a filling of mercury and a rare gas in a gastight manner. The discharge vessel is made from a glass of essentially 60–80% by weight $SiO_2$ and 10–20% by weight $Na_2O$. Preferably, the composition of this so-called sodium-rich glass is made of 70–75% by weight $SiO_2$, 15–18% by weight $Na_2O$ and 0.25–2% by weight $K_2O$. At least a part of the inner surface of the discharge vessel is provided with a transparent layer having a borate or a phosphate of an alkaline-earth metal and/or of scandium, yttrium or another rare earth metal. Preferably, the alkaline-earth metal is calcium, strontium and/or barium. In a particularly preferred embodiment, the transparent layer is made of yttrium borate and strontium borate. Additionally, the transparent layer preferably has a thickness between 5 and 200 nm and has provided on it a luminescent layer.

8 Claims, 2 Drawing Sheets

LOW-PRESSURE MERCURY VAPOR DISCHARGE LAMP AND COMPACT FLUORESCENT LAMP

Figure 1A:
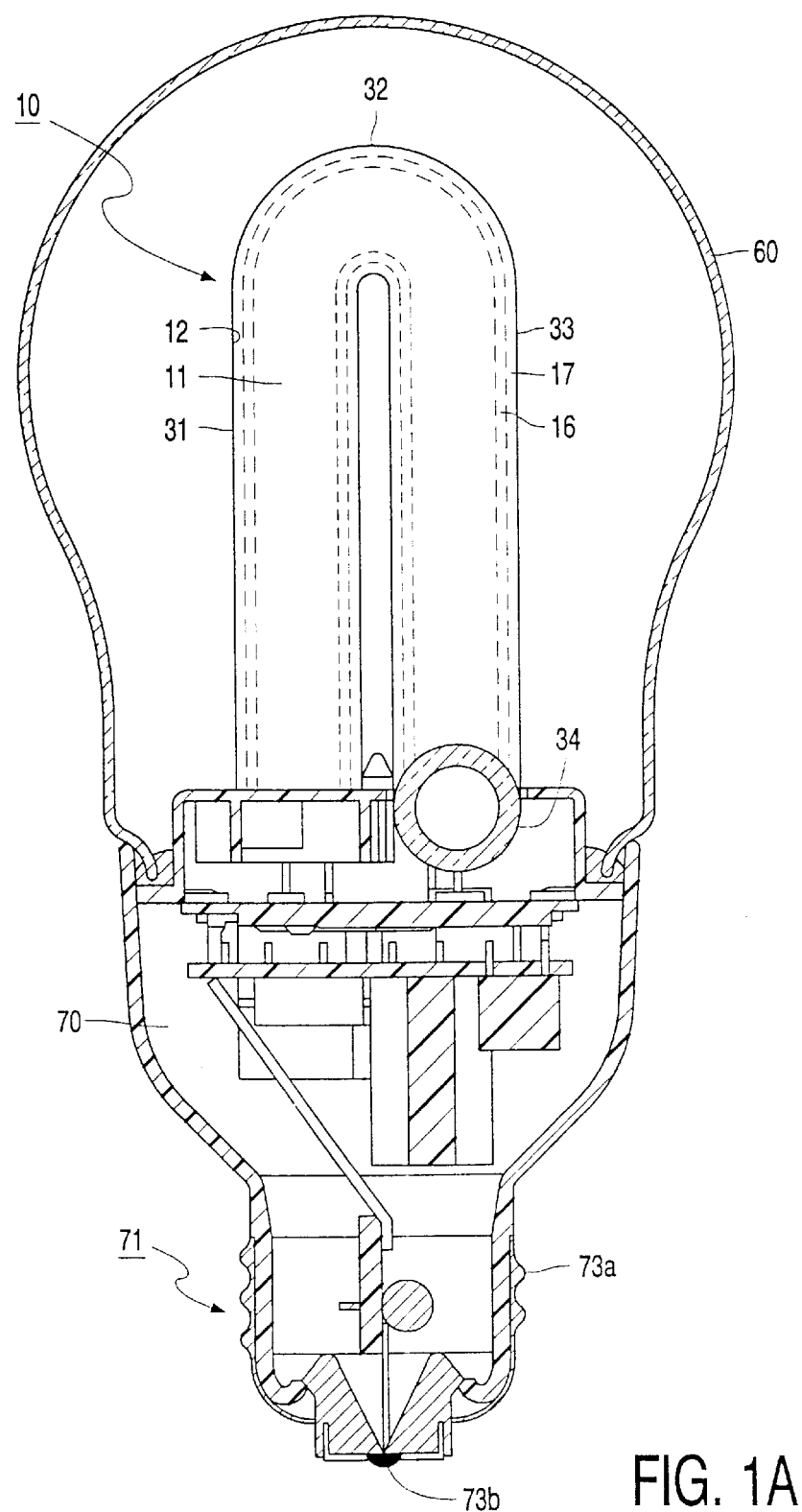

The invention relates to a low-pressure mercury vapor discharge lamp comprising a light-transmitting discharge vessel, said discharge vessel enclosing, in a gastight manner, a discharge space provided with a filling of mercury and a rare gas, at least a part of an inner wall of the discharge vessel being provided with a transparent layer.

The invention also relates to a compact fluorescent lamp.

In mercury vapor discharge lamps, mercury constitutes the primary component for the (efficient) generation of ultraviolet (UV) light. A luminescent layer comprising a luminescent material (for example, a fluorescent powder) may be present on an inner wall of the discharge vessel to convert UV to other wavelengths, for example, to UV-B and UV-A for tanning purposes (sun panel lamps) or to visible radiation for general illumination purposes. Such discharge lamps are therefore also referred to as fluorescent lamps. The discharge vessel of low-pressure mercury vapor discharge lamps is usually tubular and circular in section and comprises both elongated and compact embodiments. Generally, the tubular discharge vessel of so-called compact fluorescent lamps comprises a collection of relatively short straight parts having a relatively small diameter, which straight parts are connected together by means of bridge parts or arc-shaped parts. Compact fluorescent lamps are usually provided with an (integrated) lamp cap.

It is known that measures are taken in low-pressure mercury vapor discharge lamps to inhibit blackening of parts of the inner wall of the discharge vessel, which parts are in contact with a discharge which, during operation of the discharge lamp, is present in the discharge space. Such blackening, which is brought about by interaction between mercury and the glass from which the discharge vessel is made, is undesirable and does not only lead to a reduction of the maintenance but also to an unaesthetic appearance of the lamp, particularly because the blackening occurs irregularly, for example, in the form of dark stains or dots.

A low-pressure mercury vapor discharge lamp of the type described in the opening paragraph is known from U.S. Pat. No. 4,544,997. In the known discharge lamp, an oxide selected from the group formed by yttrium, scandium, lanthanum, gadolinium, ytterbium and lutetium is used as the transparent layer. The oxide is provided as a thin layer on the inner wall of the discharge vessel. The known transparent layers are colorless, hardly absorb UV radiation or visible light and satisfy the requirements with respect to light and radiation transmissivity. The use of the known transparent layers causes blackening and discoloring of the inner wall of the discharge vessel of the low-pressure mercury vapor discharge lamp to be reduced.

A drawback of the use of the known low-pressure mercury vapor discharge lamp is that the maintenance still is relatively poor due to said blackening. As a result, in addition, a relatively large amount of mercury is necessary for the known lamp in order to realize a sufficiently long service life. In the case of injudicious processing after the end of the service life, this is detrimental to the environment.

It is an object of the invention to provide a low-pressure mercury vapor discharge lamp of the type described in the opening paragraph, having an improved maintenance.

To this end, the low-pressure mercury vapor discharge lamp according to the invention is characterized in that the discharge vessel is made from a glass comprising silicon dioxide and sodium oxide, with the glass composition comprising the following essential constituents, given in percentages by weight (wt. %):

| | |
|---|---|
| $SiO_2$ | 60–80 wt. %, |
| $Na_2O$ | 10–20 wt. %, | and in that the transparent layer comprises a borate and/or a phosphate of an alkaline earth metal and/or of scandium, yttrium or a further rare earth metal.

A discharge vessel of a low-pressure mercury vapor discharge lamp according to the invention having the above glass composition and comprising a transparent layer including said borate and/or phosphate appears to be very well resistant to the action of the mercury-rare gas atmosphere which, in operation, prevails in the discharge vessel of the low-pressure mercury vapor discharge lamp. As a result, blackening due to interaction between mercury and the glass from which the discharge vessel is manufactured is reduced, resulting in an improvement of the maintenance. During the service life of the discharge lamp, a smaller quantity of mercury is withdrawn from the discharge, so that, in addition, a reduction of the mercury consumption of the discharge lamp is obtained and in the manufacture of the low-pressure mercury vapor discharge lamp a smaller mercury dose will suffice.

Blackening caused by withdrawing mercury from the discharge occurs in straight parts as well as arc-shaped parts of the low-pressure mercury vapor discharge lamp. In general, blackening is reduced by providing the inner wall of the discharge vessel with a sufficiently adherent and sufficiently thick transparent layer. In general, the arc-shaped lamp parts of compact fluorescent lamps are more subject to blackening than the straight lamp parts. The arc-shaped lamp parts are generally not bent until after the tubular discharge vessel has been provided with the transparent layer and, if necessary, a luminescent layer. In the bending operation, the thickness of the transparent layer in the arc-shaped lamp parts is reduced and the transparent layer is stretched, which may result in the formation of cracks in the transparent layer. Crack formation occurs in particular in the known discharge lamp wherein an oxide selected from the group formed by yttrium, scandium, lanthanum, gadolinium, ytterbium and lutetium is used as the transparent layer. The application of a transparent layer according to the invention in combination with the sodium-rich glass in accordance with the invention causes blackening to be substantially reduced in the straight parts as well as the arc-shaped parts of the low-pressure mercury vapor discharge lamp.

The measure according to the invention is notably suitable for compact fluorescent lamps having arc-shaped lamp parts, wherein the discharge vessel is additionally surrounded by a light-transmitting envelope. The temperature of the discharge vessel of such "covered" compact fluorescent lamps is comparatively high because the heat dissipation to the environment is reduced by the presence of the envelope. This unfavorable temperature balance adversely affects the maintenance of the known discharge lamp due to an increased level of blackening. In experiments it has surprisingly been found that the maintenance of a compact fluorescent lamp provided with a low-pressure mercury vapor discharge lamp according to the invention, the discharge vessel of which is surrounded by an envelope, exceeds 90% after 2000 burning hours, while the maintenance of an identical compact fluorescent lamp provided with the known low-pressure mercury vapor discharge lamp, the discharge vessel of which is surrounded by an envelope, is less than 80% after 2000 burning hours.

An additional advantage of the use of a discharge vessel in accordance with the invention in low-pressure mercury vapor discharge lamps is that the glass is comparatively inexpensive. In the known discharge lamp use is made of a so-called mixed alkali glass having a comparatively small $SiO_2$ content and comprising, inter alia, approximately 8 wt. % $Na_2O$ and 5 wt. % $K_2O$. The cost price of said glass is comparatively high.

A comparison between the composition of the known glass and the glass in accordance with the invention shows that the alkali content is different. The glass in accordance with the invention is a so-called sodium-rich glass with a comparatively low potassium content, while the known glass is a so-called mixed alkali glass having an approximately equal molar ratio of $Na_2O$ and $K_2O$. An advantage resides in that the mobility of the alkali ions in the sodium-rich glass is comparatively high with respect to the mobility in the mixed alkali glass. In addition, melting of sodium-rich glass is comparatively easier than melting mixed alkali glass.

The transparent layer in the low-pressure mercury-vapor discharge lamp in accordance with the invention further satisfies the requirements with respect to light and radiation transmissivity and can be easily provided as a very thin, closed and homogeneous transparent layer on an inner wall of a discharge vessel of a low-pressure mercury vapor discharge lamp. This is effected, for example, by rinsing the discharge vessel with a solution of a mixture of suitable metal-organic compounds (for example, acetonates or acetates, for example, scandium acetate, yttrium acetate, lanthanum acetate or gadolinium acetate mixed with calcium acetate, strontium acetate or barium acetate) and boric acid or phosphoric acid diluted in water, while the desired transparent layer is obtained after drying and sintering.

An additional advantage of the use of a transparent layer according to the invention in low-pressure mercury vapor discharge lamps is that such layers have a relatively high reflectivity in the wavelength range around 254 nm (in the discharge vessel, mercury generates, inter alia, resonance radiation having a wavelength of 254 nm). Given the refractive index of the transparent layer, which is relatively high with respect to the refractive index of the inner wall of the discharge vessel, such a layer thickness is preferably chosen that the reflectivity at said wavelength is maximal. By using such transparent layers, the initial light output of low-pressure mercury vapor discharge lamps is increased.

The glass composition preferably includes the following constituents:

| | |
|---|---|
| $SiO_2$ | 70–75 wt. % |
| $Na_2O$ | 15–18 wt. % |
| $K_2O$ | 0.25–2 wt. %. |

The composition of such a sodium-rich glass is similar to that of ordinary window glass and it is comparatively cheap with respect to the glass used in the known discharge lamp. The cost price of the raw materials for the sodium-rich glass as used in the discharge lamp in accordance with the invention is only approximately 75% of the cost price of the raw materials for the mixed alkali glass as used in the known discharge lamp. Moreover, the conductance of said sodium-rich glass is comparatively low; at 250° C. the conductance is approximately.

$$\log \rho = 6.3.$$

while the corresponding value of the mixed alkali glass is approximately $$\log \rho = 8.9.$$

In a preferred embodiment of the low-pressure mercury vapor discharge lamp according to the invention, the transparent layer comprises a borate and/or a phosphate of calcium, strontium and/or barium. Such a transparent layer has a relatively high coefficient of transmission for visible light. Moreover, low-pressure mercury vapor discharge lamps with a transparent layer comprising calcium borate, strontium borate or barium borate or calcium phosphate, strontium phosphate or barium phosphate have a good maintenance.

In a particularly preferred embodiment of the low-pressure mercury vapor discharge lamp according to the invention, the transparent layer comprises yttrium borate and strontium borate. Such a transparent layer has a relatively high coefficient of transmission for ultraviolet radiation and visible light. It has further been found that a transparent layer comprising yttrium borate and strontium borate is only slightly hygroscopic and adheres well to the inner wall of the discharge vessel. Moreover, the layer can be provided in a relatively simple manner (for example, with yttrium acetate and strontium acetate mixed with boric acid), which has a cost-saving effect, notably in a mass manufacturing process for low-pressure mercury vapor discharge lamps.

In practical embodiments of the low-pressure mercury vapor discharge lamp, said transparent layer has a thickness of approximately 5 nm to approximately 200 nm. At a layer thickness of more than 200 nm, excessive absorption of the radiation generated in the discharge space takes place. At a layer thickness of less than 5 nm, there is interaction between the discharge and the wall of the discharge vessel. Such layer thicknesses are customarily obtained by means of optical measurements. A layer thickness in the range from approximately 50 nm to approximately 90 nm is particularly suitable. In said preferred range, the transparent layer has a relatively high reflectivity in the wavelength range around 254 nm.

A further preferred embodiment of the low-pressure mercury vapor discharge lamp according to the invention is characterized in that a side of the transparent layer facing the discharge space is provided with a layer of a luminescent material. An advantage of the use of a transparent layer according to the invention in low-pressure mercury vapor discharge lamps is that the luminescent layer comprising a luminescent material (for example, a fluorescent powder) adheres significantly better to such a transparent layer than to a transparent layer of the known low-pressure mercury vapor discharge lamp. Said improved adhesion is obtained particularly in the arc-shaped parts of low-pressure mercury-vapor discharge lamps.

These and other aspects of the invention will be apparent from and elucidated with reference to the embodiments described hereinafter.

Figure 1B:
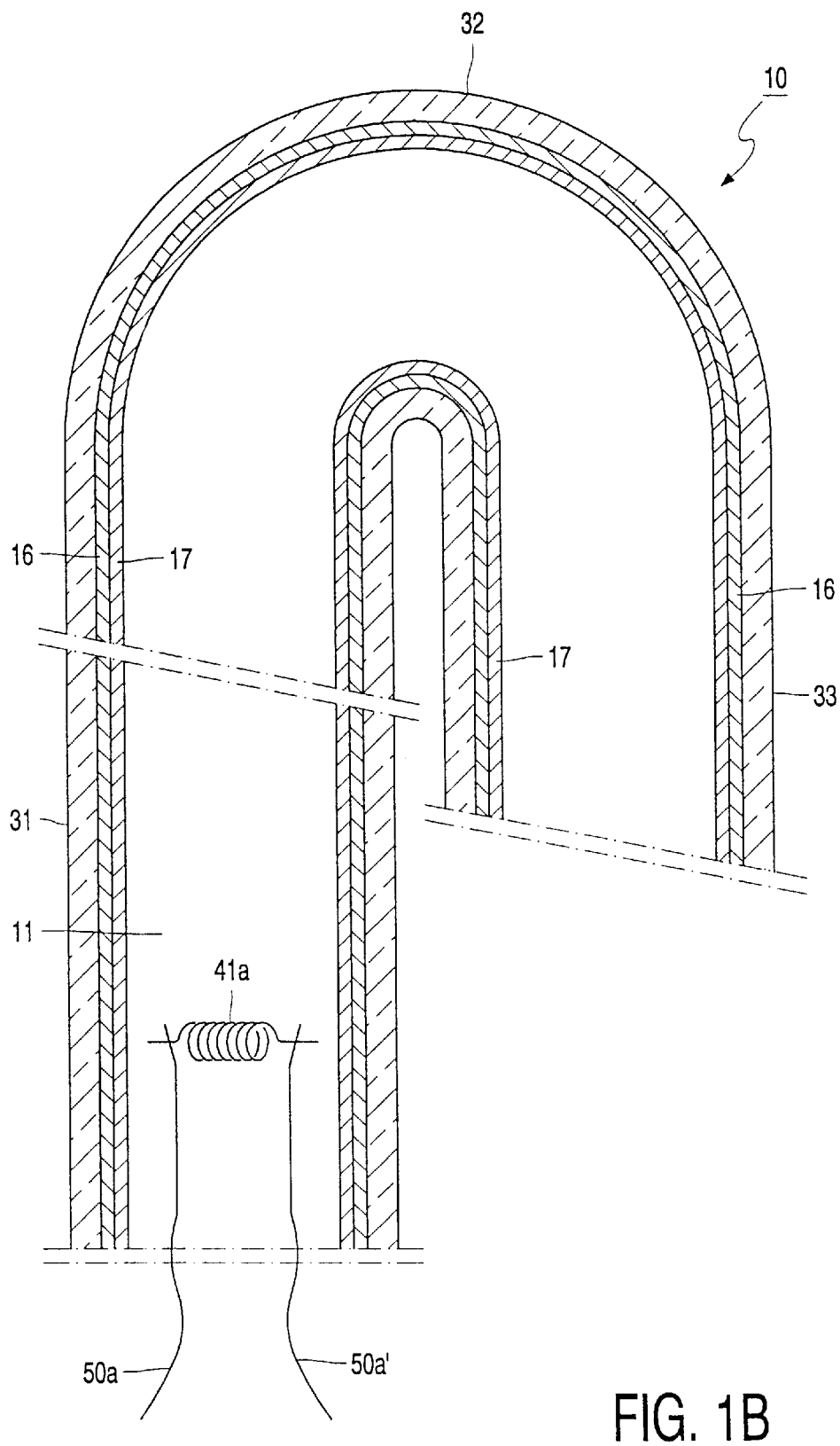

In the drawings:

FIG. 1A is a cross-sectional view of an embodiment of a compact fluorescent lamp comprising a low-pressure mercury vapor discharge lamp according to the invention, and FIG. 1B is a cross-sectional view of a detail of the low-pressure mercury vapor discharge lamp as shown in FIG. 1A.

The Figures are purely diagrammatic and not drawn to scale. Particularly for clarity, some dimensions are exaggerated strongly. Similar components in the Figures are denoted by the same reference numerals as much as possible.

FIG. 1 shows a compact fluorescent lamp comprising a low-pressure mercury vapor discharge lamp. The low-pressure mercury-vapor discharge lamp is provided with a radiation-transmitting discharge vessel 10 enclosing, in a gastight manner, a discharge space 11 having a volume of approximately 10 cm$^3$. The discharge vessel 10 is a glass tube which is at least substantially circular in cross-section and the (effective) internal diameter D of which is approximately 10 mm. The tube is bent in the form of a so-called hook and, in this embodiment, it has a number of straight parts, two of which, referenced 31, 33, are shown in FIG. 1A. The discharge vessel further comprises a number of arc-shaped parts, two of which, referenced 32, 34, are shown in FIG. 1A. An inner wall 12 of the discharge vessel 10 is provided with a transparent layer 16 according to the invention and with a luminescent layer 17. In an alternative embodiment, the luminescent layer has been omitted. The discharge vessel 10 is supported by a housing 70 which also supports a lamp cap 71 provided with electrical and mechanical contacts 73a, 73b, which are known per se. The discharge vessel 10 of the low-pressure mercury-vapor discharge lamp is surrounded by a light-transmitting envelope 60 which is attached to the lamp housing 70. The light-transmitting envelope 60 generally has a matt appearance.

FIG. 1B very diagrammatically shows a cross-sectional view of a detail of the low-pressure mercury-vapor discharge lamp shown in FIG. 1A. The discharge space 11 in the discharge vessel 10 does not only comprise mercury but also a rare gas, argon in this example. Means for maintaining a discharge are constituted by an electrode pair 41a (only one electrode is shown in FIG. 1B) which is arranged in the discharge space 11. The electrode pair 41a is a winding of tungsten coated with an electron-emissive material, here a mixture of barium oxide, calcium oxide and strontium oxide. Each electrode 41a is supported by an (indented) end portion of the discharge vessel 10 (not shown in FIGS. 1A and 1B). Current supply conductors 50a, 50a' issue from the electrode pair 41a through the end portions of the discharge vessel 10 to the exterior. The current supply conductors 50a, 50a' are connected to an (electronic) power supply which is accommodated in the housing 70 and electrically connected to the electrical contacts 73b at the lamp cap 71 (see FIG. 1A).

The glass of the discharge vessel of the low-pressure mercury-vapor discharge lamp has a composition in accordance with the invention which comprises silicon dioxide and sodium oxide as important constituents. In the example shown in FIGS. 1A and 1B, the discharge vessel in accordance with the invention is made from so-called sodium-rich glass. Particularly preferred is a glass of the following composition: 70–74 wt. % SiO2, 16–18 wt. % Na$_2$O, 0.5–1.3 wt. % K$_2$O, 4–6 wt. % CaO, 2.5–3.5 wt. % MgO, 1–2 wt. % Al$_2$O$_3$, 0–0.6 wt. % Sb$_2$O$_3$, 0–0.15 wt. % Fe$_2$O$_3$ and 0–0.05 wt. % MnO.

In an embodiment of the low-pressure mercury vapor discharge lamp, various concentrations of an Sr(Ac)$_2$ (strontium acetate) solution and H$_3$BO$_3$ (boric acid) are added to solutions comprising various concentrations of Y(Ac)$_3$ (yttrium acetate) to manufacture the transparent layer 16 according to the invention. In an alternative embodiment, a Ba(Ac)$_2$ (barium acetate) solution is added instead of an Sr(Ac)$_2$ solution. Three recipes were tested, as shown in Table I.

TABLE I

Three recipes for a transparent layer in accordance with the invention.

| Recipe | wt. % Y(Ac)$_3$ | mol Sr(Ac)$_2$ | mol H$_3$BO$_3$ |
|---|---|---|---|
| R$_1$ | 3.75 | 0.036 | 0.147 |
| R$_2$ | 5 | 0.06 | 0.24 |
| R$_3$ | 5 | 0.048 | 0.191 |

After rinsing and drying, tubular discharge vessels were provided with a coating by passing an excess of the aforementioned solutions through the discharge vessels. After said coating operation, the discharge vessels were first dried in air at a temperature of approximately 60° C. for 15 minutes and subsequently sintered at approximately 400° C. for 15 minutes. In an alternative embodiment, the transparent coating is fixed in a shorter period of time at a higher temperature. The thickness of the transparent layer ranges from approximately 50 nm to approximately 90 nm.

Subsequently, the discharge vessels were provided with a luminescent coating comprising three known phosphors, namely a green-luminescent material with terbium-activated cerium magnesium aluminate, a blue-luminescent material with bivalent europium-activated barium magnesium aluminate, and a red-luminescent material with trivalent europium-activated yttrium oxide. After coating, the discharge vessels were bent in the known hook shape having straight parts and arcuate parts. A number of said discharge vessels were subsequently assembled to low-pressure mercury vapor discharge lamps in the customary manner. A number of these discharge lamps were subsequently provided with a transparent envelope on the basis of one of the three recipes mentioned hereinabove (see the example shown in FIG. 1A). Experiments were carried out on discharge vessels of two lengths, namely 230 mm (11W fluorescent lamp) and 405 mm (20W fluorescent lamp). The current intensity of the lamp during operation was 200 mA in all cases.

First, the maintenance after 1,000 and 2,000 hours was measured of low-pressure mercury-vapor discharge lamps comprising the known discharge vessel made from a mixed alkali glass provided with a transparent layer in accordance with the invention. The result of this measurement is shown in Table II. The maintenance is standardized in a customary manner with respect to the value after 100 burning hours of the discharge lamp.

TABLE II

Maintenance of low-pressure mercury-vapor discharge lamps comprising the known discharge vessel made from a mixed alkali glass provided with a transparent layer in accordance with the invention.

| | Maintenance (%) | | | |
|---|---|---|---|---|
| | 230 mm (11 Watt) | | 405 mm (20 Watt) | |
| | 1000 hr | 2000 hr | 1000 hr | 2000 hr |
| with envelope | | | | |
| R$_1$ | 92 | 88 | 96 | 93 |
| no layer | 87 | 77 | 83 | 72 |
| without envelope | | | | |
| R$_1$ | 97 | 92 | 95 | 91 |
| no layer | 92 | 89 | 91 | 85 |

Table II shows that after 1,000 and 2,000 hours the maintenance of discharge lamps comprising the known discharge vessel and provided with the transparent layer according to the invention is substantially improved. The largest improvement is obtained in discharge lamps provided with a light-transmitting envelope.

Subsequently, the maintenance after 1,000 and 2,000 hours has been measured of low-pressure mercury-vapor discharge lamps comprising a discharge vessel in accordance with the invention and provided with various embodiments of the transparent layer in accordance with the invention. The result of this measurement is shown in Table III.

TABLE III

Maintenance of low-pressure mercury-vapor discharge lamps comprising a discharge vessel made from sodium-rich glass in accordance with the invention and provided with various embodiments of the transparent layer in accordance with the invention.

| | Maintenance (%) | | | |
|---|---|---|---|---|
| | 230 mm (11 Watt) | | 405 mm (20 Watt) | |
| | 1000 hr | 2000 hr | 1000 hr | 2000 hr |
| with envelope | | | | |
| $R_1$ | 92 | 91 | 98 | 96 |
| $R_2$ | 93 | 92 | 97 | 95 |
| $R_3$ | 95 | 93 | 100 | 99 |
| no layer | 76 | 64 | 56 | 34 |
| without envelope | | | | |
| $R_1$ | 91 | 90 | 95 | 94 |
| $R_2$ | 92 | 91 | 96 | 96 |
| $R_3$ | 92 | 91 | 96 | 96 |
| no layer | 80 | 69 | 75 | 52 |

Table III shows that after 1,000 and 2,000 hours the maintenance of discharge lamps comprising the discharge vessel in accordance with the invention and provided with the transparent layer according to the invention is substantially improved. The largest improvement is obtained in discharge lamps provided with a light-transmitting envelope. Up to 2,000 hours there is no significant difference in maintenance between the three compositions of the transparent layer in accordance with the invention.

It will be evident that within the scope of the invention many variations are possible to those skilled in the art.

The scope of protection of the invention is not limited to the examples given herein. The invention is embodied in each novel characteristic and each combination of characteristics. Reference numerals in the claims do not limit the scope of protection of the claims. The word "comprising" does not exclude the presence of elements other than those mentioned in the claims. The use of the word "a" or "an" in front of an element does not exclude the presence of a plurality of such elements.

What is claimed is:

1. A low-pressure mercury vapor discharge lamp comprising a light-transmitting discharge vessel (10), said discharge vessel (10) enclosing, in a gastight manner, a discharge space (11) provided with a filling of mercury and a rare gas, at least a part of an inner wall of the discharge vessel (10) being provided with a transparent layer (16), characterized in that the discharge vessel (10) is made from a glass comprising silicon dioxide and sodium oxide, with the glass composition comprising the following essential constituents, given in percentages by weight (wt. %):

| $SiO_2$ | 60–80 wt. %, |
|---|---|
| $Na_2O$ | 10–20 wt. %, | and in that the transparent layer (16) comprises a borate and/or a phosphate of an alkaline earth metal and/or of scandium, yttrium or a further rare earth metal.

2. A low-pressure mercury vapor discharge lamp as claimed in claim 1, characterized in that the glass composition includes the following constituents:

| $SiO_2$ | 70–75 wt. % |
|---|---|
| $Na_2O$ | 15–18 wt. % |
| $K_2O$ | 0.25–2 wt. %. |

3. A low-pressure mercury vapor discharge lamp as claimed in claim 1 a characterized in that the alkaline-earth metal is calcium, strontium and/or barium.

4. A low-pressure mercury vapor discharge lamp as claimed in claim 1 a characterized in that the transparent layer (16) comprises yttrium borate and strontium borate.

5. A low-pressure mercury vapor discharge lamp as claimed in claim 1, a characterized in that the transparent layer (16) has a thickness between 5 nm and 200 nm.

6. A low-pressure mercury vapor discharge lamp as claimed in claim 1, a characterized in that a side of the transparent layer (16) facing the discharge space (11) is provided with a layer (17) of a luminescent material.

7. A compact fluorescent lamp comprising a low-pressure mercury-vapor discharge lamp as claimed in claim 1, a wherein a lamp housing (70) is attached to the discharge vessel (10) of the low-pressure mercury-vapor discharge lamp, which lamp housing is provided with a lamp cap (71).

8. A compact fluorescent lamp as claimed in claim 7, characterized in that the discharge vessel (10) of the low-pressure mercury-vapor discharge lamp is surrounded by a light-transmitting envelope (60) which is attached to the lamp housing (70).

* * * * *